March 24, 1959  S. L. GILLESPIE  2,878,880
CONTROL FOR CONTROLLABLE PITCH MARINE PROPELLERS
Filed Feb. 24, 1954  6 Sheets-Sheet 2
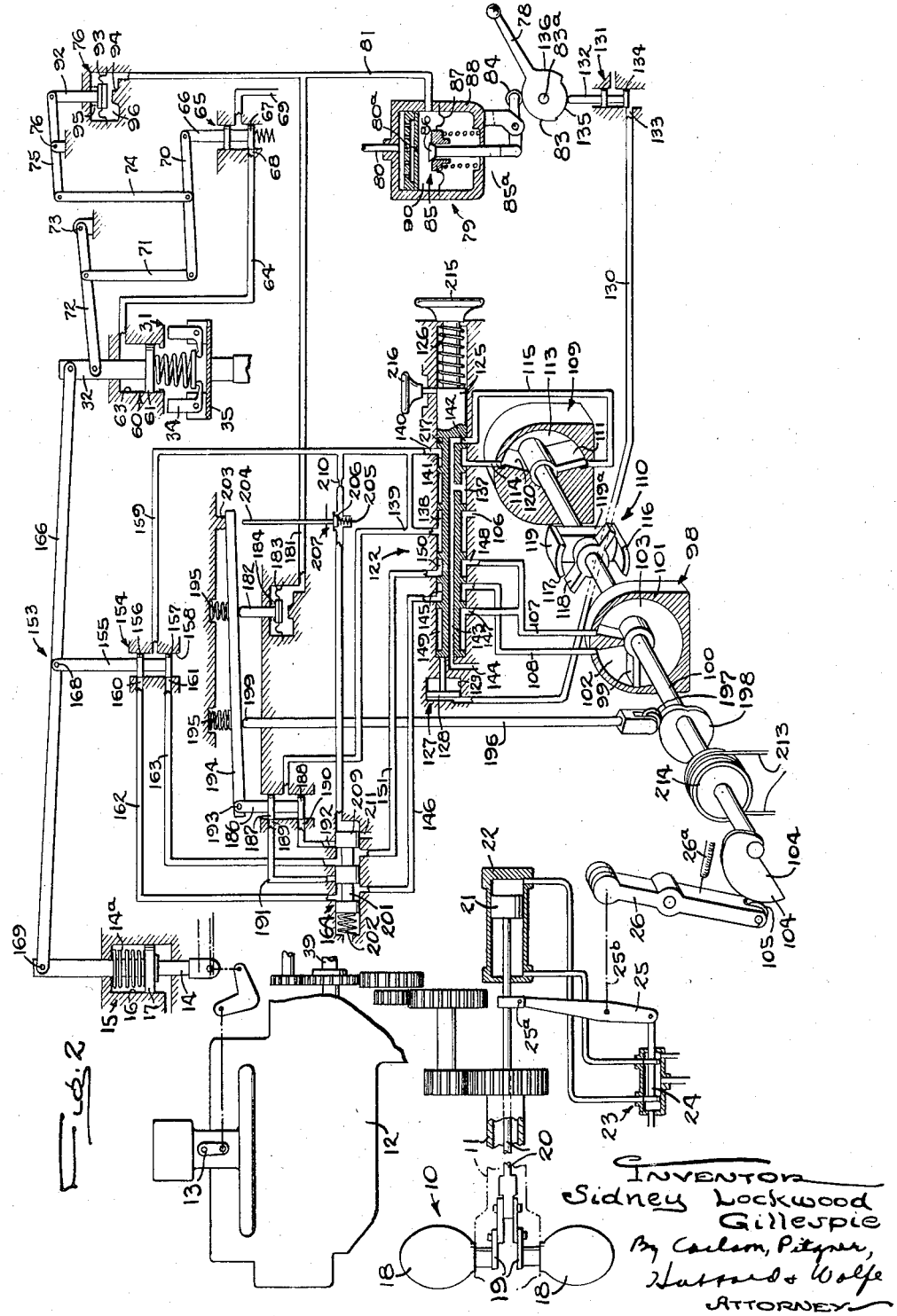
INVENTOR
Sidney Lockwood
Gillespie
By Carlsen, Pitzner,
Hatfield & Wolfe
ATTORNEY

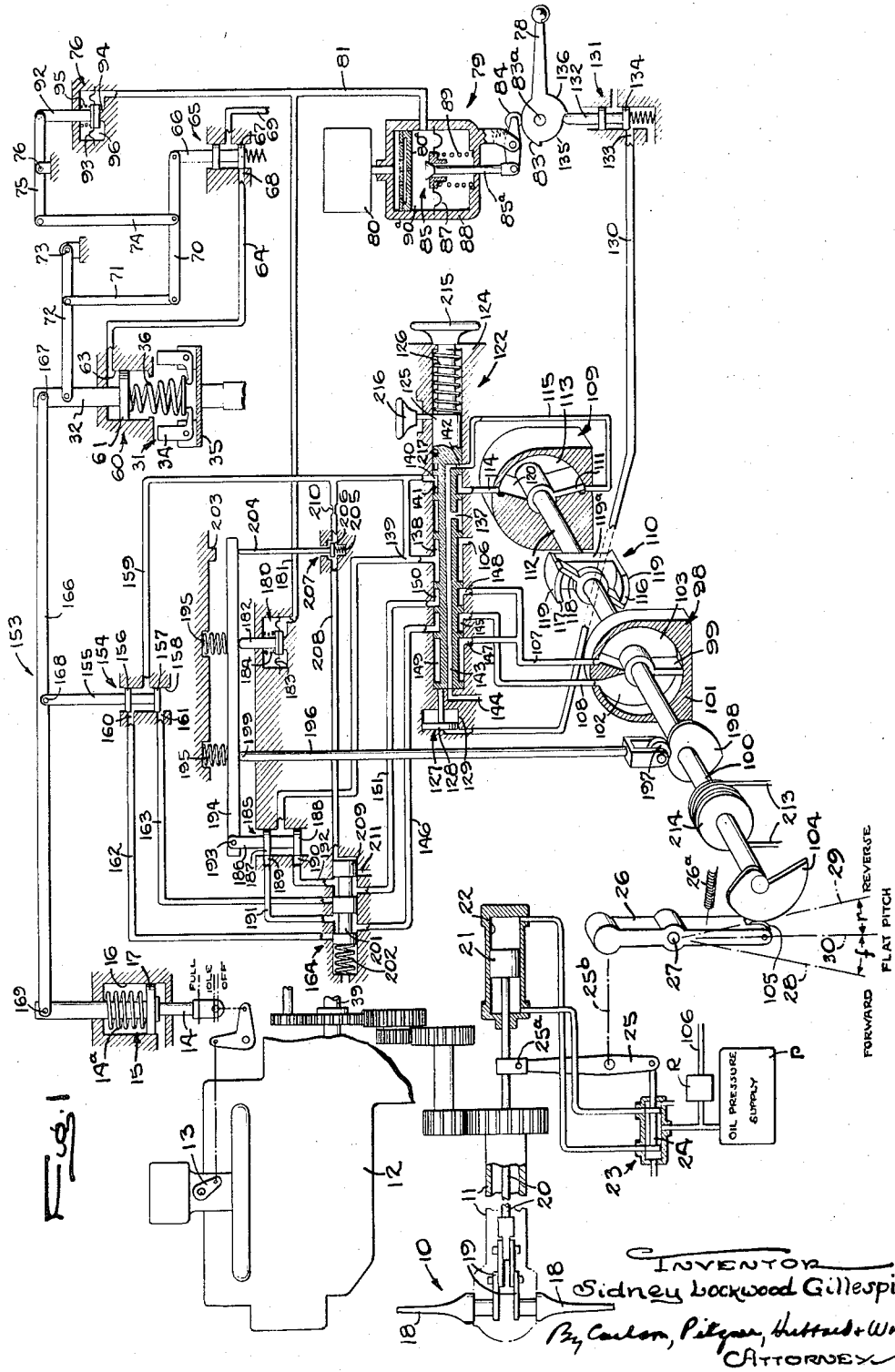

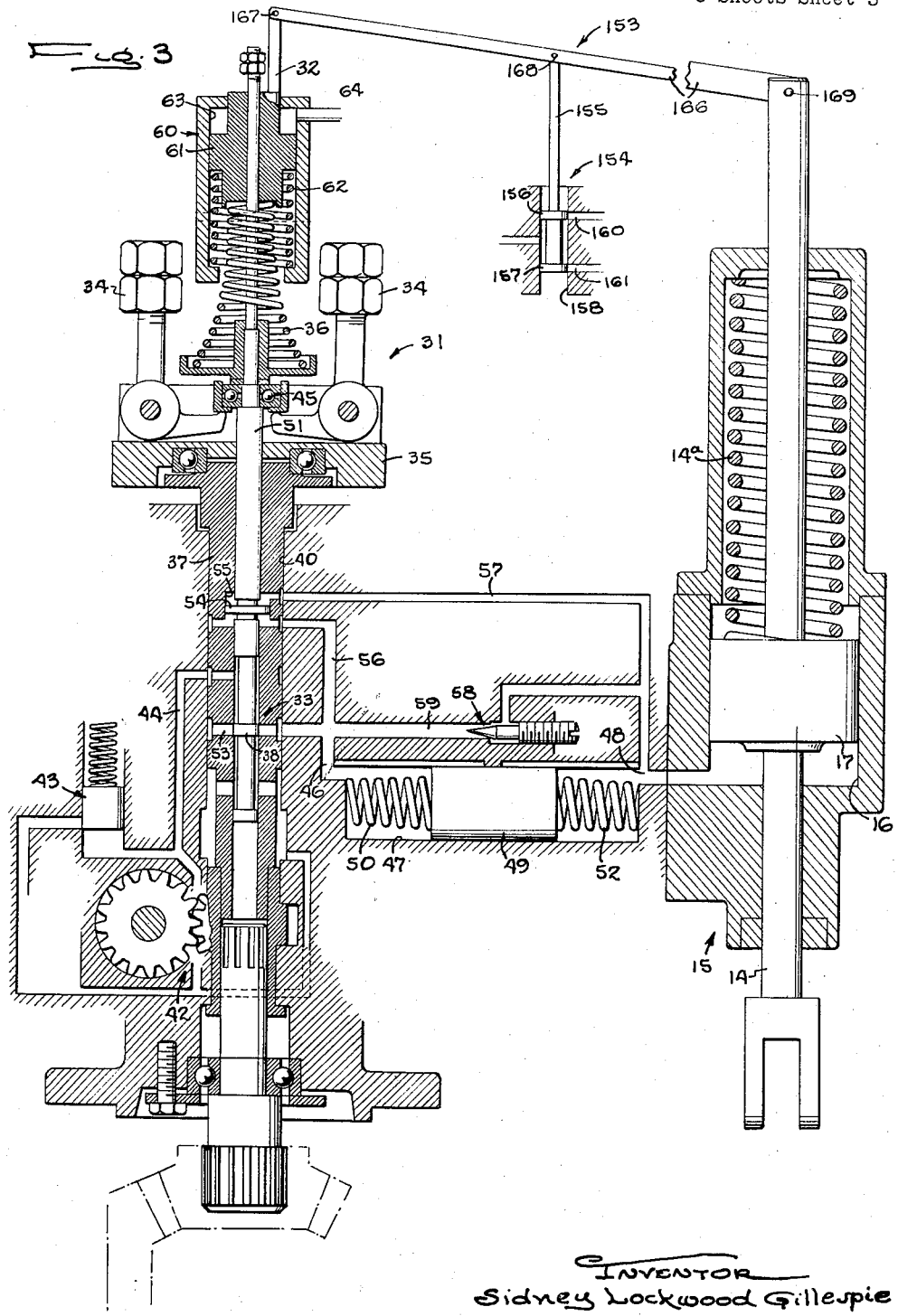

March 24, 1959  S. L. GILLESPIE  2,878,880
CONTROL FOR CONTROLLABLE PITCH MARINE PROPELLERS
Filed Feb. 24, 1954  6 Sheets-Sheet 4
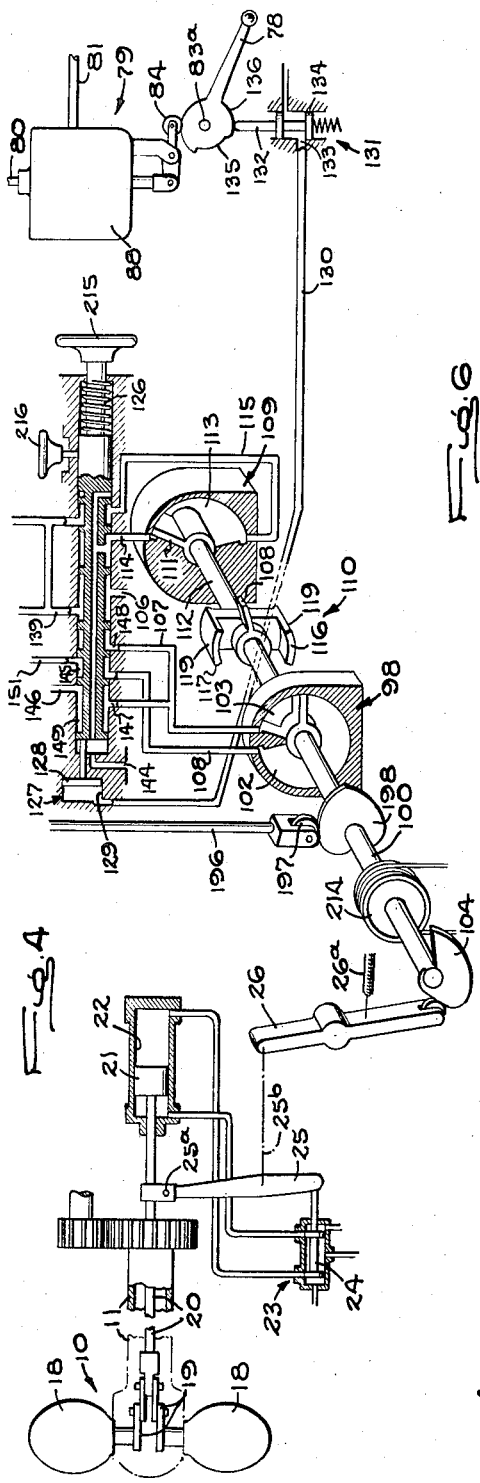
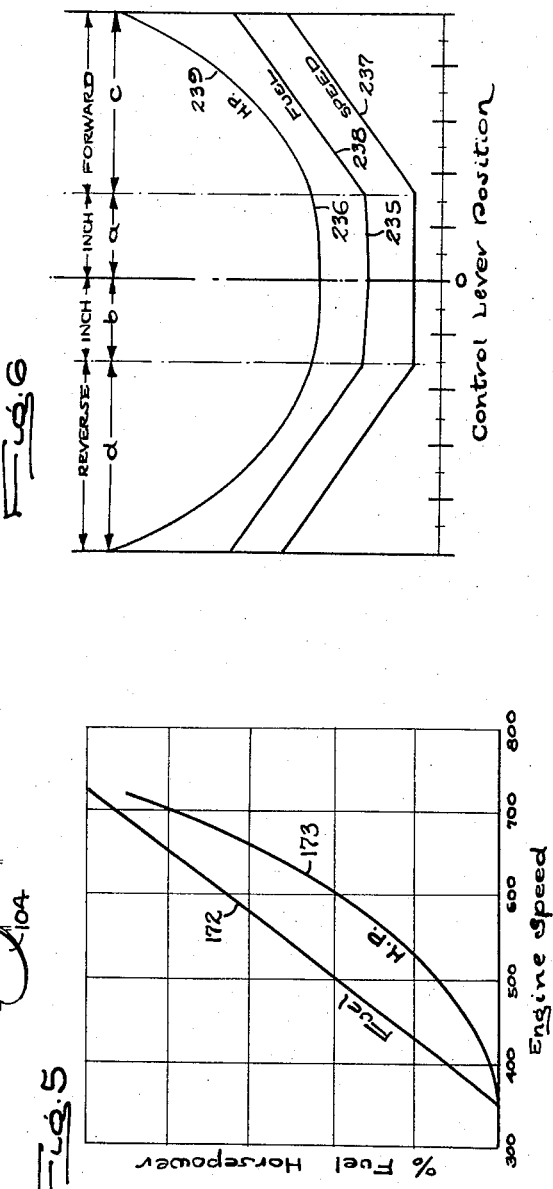
INVENTOR
Sidney Lockwood Gillespie
By Carlson, Pitzner, Hubbard & Wolfe
ATTORNEY March 24, 1959     S. L. GILLESPIE     2,878,880
CONTROL FOR CONTROLLABLE PITCH MARINE PROPELLERS
Filed Feb. 24, 1954     6 Sheets-Sheet 5
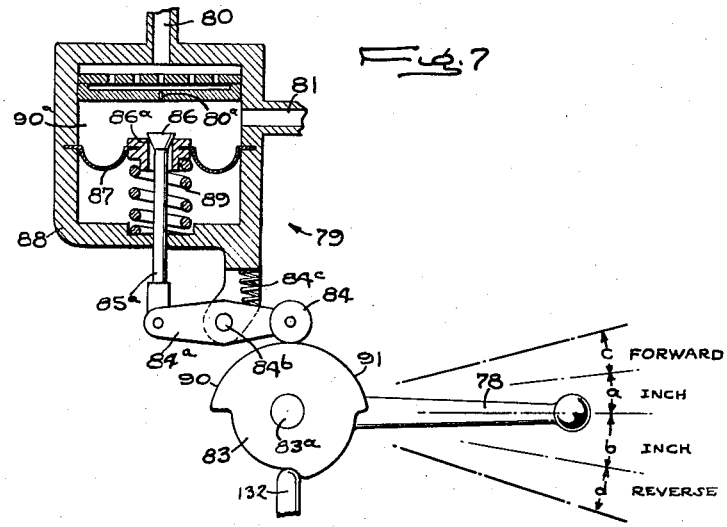
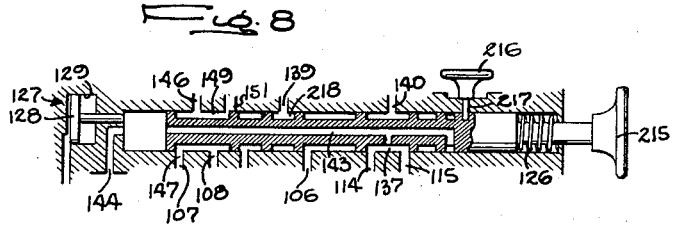
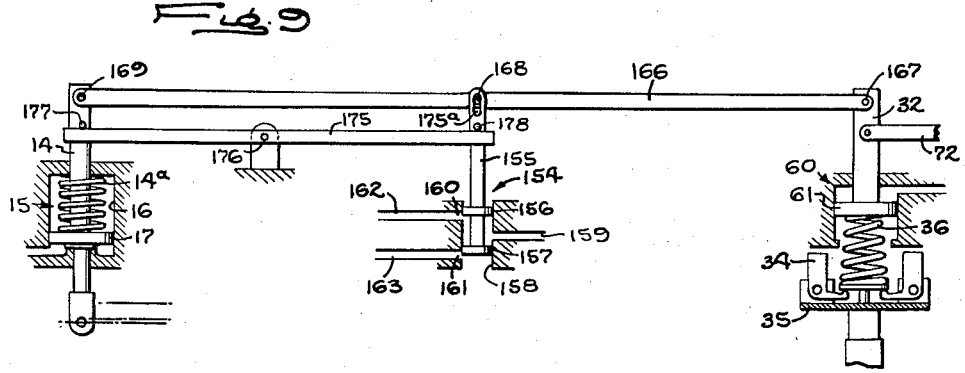

March 24, 1959   S. L. GILLESPIE   2,878,880
CONTROL FOR CONTROLLABLE PITCH MARINE PROPELLERS
Filed Feb. 24, 1954   6 Sheets-Sheet 6
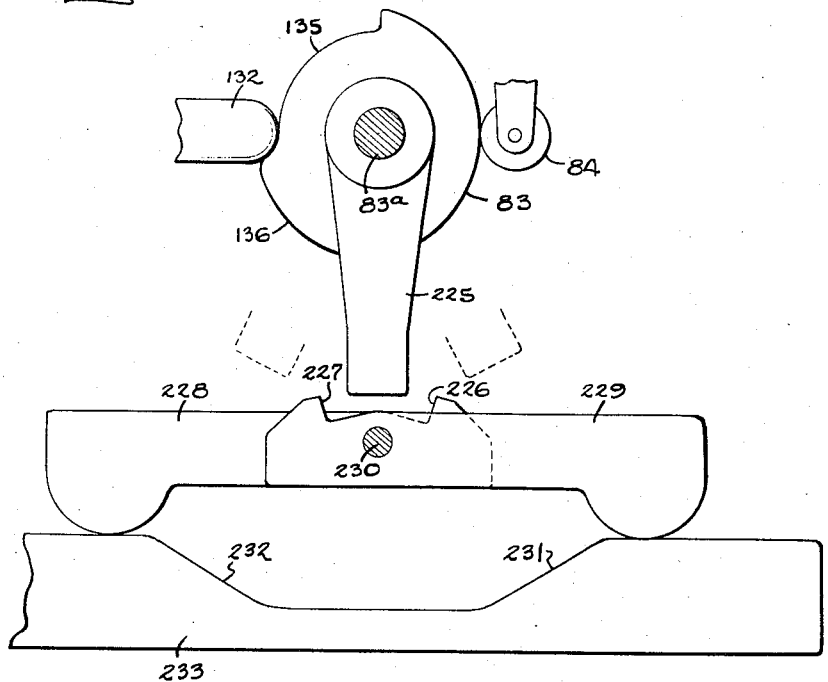
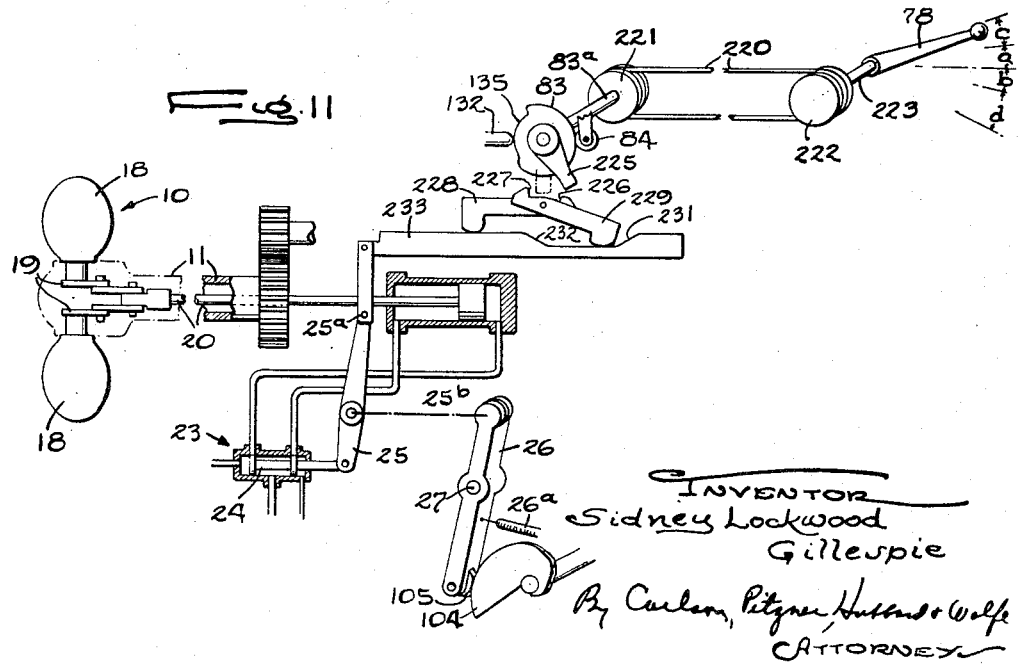
INVENTOR
Sidney Lockwood
Gillespie
By Carlson, Pitzner, Hubbard & Wolfe
ATTORNEY United States Patent Office 2,878,880
Patented Mar. 24, 1959

2,878,880

CONTROL FOR CONTROLLABLE PITCH MARINE PROPELLERS

Sidney Lockwood Gillespie, Rockford, Ill., assignor to Woodward Governor Company, Rockford, Ill., a corporation of Illinois Application February 24, 1954, Serial No. 412,324

16 Claims. (Cl. 170—135.74)

This invention relates generally to controllable pitch propellers for water craft, and in some of its aspects has more particular reference to a ship propulsion system in which the propeller is driven by a prime mover to which the flow of fuel or other energy medium is regulated automatically by an adjustable speed governor.

One object is to adjust the propeller pitch automatically and correlate the same with the supply of energy medium to the prime mover so as to maintain optimum operating efficiency of the latter and the propeller under widely varying conditions of service use.

A second object is to adjust the propeller pitch automatically so as to maintain a definite power output of the prime mover for each different speed setting of the governor.

A third object is to provide for automatic adjustment of both the engine fuel supply and propeller pitch in response to changes in the position of a single manually operable device.

A fourth object is to provide in a control of the above character for automatic reversal of the propeller pitch and therefore the direction of propulsion of the ship by a selection made at a remote point of control.

A fifth object is to bring the propeller to a flat pitch automatically preparatory to starting of the prime mover.

A sixth object is to adapt an automatic control of the above character for independent manual control by manipulation of the same control lever.

A seventh object is to provide for independent manual control of the propeller pitch and for automatic control of the propeller pitch and engine fuel in response to movement of a single control lever through different ranges.

The invention also resides in the simple and novel character of the various elements employed in carrying out the foregoing objects.

Other objects and advantages of the invention will become apparent from the following detailed description taken in connection with the accompanying drawings, in which Figure 1 is a schematic view and circuit diagram of a combined prime mover and propeller pitch control embodying the novel features of the present invention.

Fig. 2 is a similar view showing the parts in other positions.

Fig. 3 is a schematic view of the prime mover governor.

Fig. 4 is a fragmentary schematic view showing still another position.

Figs. 5 and 6 are curves showing the relation between prime mover speed, fuel supply and horsepower output.

Fig. 7 is a longitudinal sectional view of the control lever and motion transmitter.

Fig. 8 is a schematic view of the transfer valve in a different position.

Fig. 9 is a fragmentary view of the modified form of the load control linkage.

Fig. 10 is a side elevational view of an interlocked mechanism.

Fig. 11 is a schematic view of an interlocked mechanism and the parts associated therewith.

In the drawings, the invention is shown as a control for regulating from a point of remote control as in the pilot house the propulsion system of a ship which comprises a controllable pitch propeller 10 driven through a shaft 11 by a prime mover 12 using fuel, steam or other energy medium. The supply of energy medium, hereinafter called "fuel" to the prime mover is varied in the usual way as by rocking an arm 13 linked to the driven element 14 of a reversible power servo 15. In the form shown, the latter is of the hydraulic type comprising a cylinder 16 and a piston 17 slidable therein and carried by the rod or driven element 14 which is urged in the fuel decreasing direction by a compression spring 14ª.

Controllable pitch marine propellers and their servo actuators may take various forms, the one shown schematically herein comprising blades 18 journaled on the outer end of the shaft 11 and carrying cranks 19 connected to the end of a rod 20 disposed within the shaft. By adjusting the rod endwise, the blades may be swung in opposite directions away from a flat or zero pitch (Fig. 1) and into "forward" or "reverse" pitch ranges to obtain various angles for propelling the ship forwardly or backwardly. The adjustment may be effected by a power servo of any suitable type such as a piston 21 and a cylinder 22 supplied with pressure fluid under the control of a valve 23 whose plunger 24 is pivoted at one end of a lever 25. One end of the latter is connected at 25ª to the rod 20 while the other end is joined by suitable linkage 25ᵇ to a pitch control element or lever 26 fulcrumed at 27 intermediate its ends and swingable between positions 28 and 29 producing maximum forward and reverse pitch of the propeller blades, the latter being at flat pitch when the element is in an intermediate or centered position 30.

When the valve plunger 24 is moved out of the centered position shown in Fig. 1, pressure fluid from a high pressure source P will be admitted to the corresponding end of the cylinder 22 to increase the propeller pitch, the other cylinder end being drained. The movement continues until the valve is recentered by the restoring motion transmitted back through the lever 25. With this follow-up arrangement, the pitch of the propeller blades closely follows changes in the position of the control element 26.

*Governor control*

The energization of the fuel adjusting servo 15 and therefore the amount of energy medium supplied to the prime mover 12 is regulated automatically by a governor 31 usually mounted on the exterior of the engine and having an element 32 movable back and forth to vary the speed setting of the governor and therefore the engine speed which is maintained. Herein, the governor is of the hydraulic type shown in Fig. 3 and in Patent 2,478,753 to which reference may be made for further details.

Briefly, the governor includes a control valve 33 actuated by changes in the positions of flyweights 34 pivoted on a head 35 which is driven by the engine to derive a centrifugal force that is balanced against the force of a speeder spring 36. The head 35 is on the upper end of a ported drive sleeve 37 which cooperates with a land 38 to form the valve 33 and is driven from the engine shaft 39 through a suitable rotary connection.

The sleeve is journaled in a bore 40 of the governor casing and drives a gear pump 42 which draws oil from a sump and cooperates with a spring loaded by-pass valve 43 to supply fluid at a constant pressure to a passage 44 leading to the valve 33. The stem 51 of the latter valve is connected to the flyweights through a bearing 45 and the valve operates in the usual way to admit pressure fluid to or permit drainage of fluid out of a passage 46 which communicates with one end of a cylinder 47 whose other end is joined by a passage 48 to the cylinder 16 of the fuel regulating servo 15. A piston 49 within the cylinder 47 is urged toward centered position by compression springs 50 and 52 so that the pressure within the servo cylinder and therefore the amount of fuel delivered to the engine varies with pressure changes in the passage 46.

With the arrangement above described a decrease in the engine speed below the prevailing setting of the governor will lower the land 38 from its neutral position opposite the ports 53 thus allowing fluid from the supply line 44 to flow into the passage 46. The pressure increase in the latter will move the piston 49 to the right thus compressing the spring 52 and forcing the fluid out of the other end of the cylinder 47 into the servo cylinder 16. Conversely, a detected rise in speed raises the land 38 and allows fluid to escape from the passage 46 to the sump which communicates with the lower end of the sleeve 37. The resulting pressure drop allows the plunger 49 to move under the higher pressure in the servo thereby compressing the spring 50 and allowing the servo piston to move under the action of its spring 14$^a$ in the speed decreasing direction.

In response to each speed change detected by the flyweights, a differential is created between the pressures in the servo cylinder 16 and the valve outlet passage 46. To produce a so-called compensating action, these pressure differentials are applied to a piston 54 fast on the valve stem and slidable in a cylinder 55 whose opposite ends communicate through passages 56 and 57 with the valve outlet 46 and the servo cylinder 16 respectively. The modifying force thus applied to the valve land is dissipated gradually by leakage of fluid through an adjustable restriction 58 in a passage 59 connecting the passages 56 and 57.

Variation in the loading of the speeder spring 36 to change the speed setting of the governor is effected in the present instance by a servo 60 which may be of various types as the one shown herein including a piston 61 which bears against the upper end of the speeder spring and is urged upwardly by a spring 62 and the speeder spring. This piston slides in a cylinder 63 to and from which pressure fluid flows through a passage 64 under the control of a valve 65 (Fig. 1) comprising a stem 66 having a land 67 thereon cooperating with a port 68 to either admit oil from a branch 69 of the governor pressure supply 44 or release oil from the passage 64 to a suitable sump.

The stem of the valve 65 is connected to one end of a floating lever 70 whose other end is joined by a link 71 to a lever 72 fulcrumed at one end on a fixed pivot 73 and joined at the other end to the governor speed setting rod 32. Intermediate its ends, the lever 70 is joined by a link 74 to one end of a lever 75 fulcrumed at 76 intermediate its ends and adjustable at its other end to proportionately vary the speed setting of the governor.

Remote control of governor adjustment

Adjustment of the lever 75 and therefore speed setting of the governor is controllable from a remote point such as the pilot house of the ship which is located remotely from the engine room. Herein, the governor setting is changed by a manually adjustable device such as a hand lever 78 which, for purposes to appear later, also selects the direction of propulsion of the ship, and adjusts the propeller pitch independently of the governor.

While various systems may be employed to transform the movements of the lever 78 into changes in the governor setting, the system shown herein is of the pneumatic type comprising a transmitter 79 (Figs. 1 and 7) adjustable selectively in response to changes in the position of the lever to vary the flow of compressed air from a supply line 80 into a conduit 81 extending from the pilot house to a receiver 76 in the governor 31 to establish different pressures corresponding to the selected lever positions. For this purpose, the lever 78 operates through a suitable coupling to turn a shaft 83a carrying a cam 83 which adjusts the position transmitter 79. While the coupling may involve flexible mechanical connections (Fig. 10) or a suitable electrical system permitting the cam to be located remotely from the hand lever, the latter is, in the form shown in Fig. 1, secured directly to the shaft 83$^a$. The cam engages a follower roller 84 on one end of a lever 84$^a$ pivoted at 84$^b$ on the transmitter casing and biased by a spring 84$^c$ to hold the roller against the cam. The other end of the lever is connected to the stem 85$^a$ on a diaphragm or partition 87 with the receiver casing 88.

A spring 89 urges the seat toward the valve member 86 with a force which increases progressively as the roller 84 rides up uniform rises 90 and 91 on opposite sides of the low point of the cam. In the center position of the hand lever (Figs. 1 and 7), the force exerted by the spring is a minimum so that the pressure in the chamber 90$^a$ will be allowed to build up to a minimum value, 10 p.s.i in this instance, when the spring force is overcome and the diaphragm 87 moves to open the valve 85 in a minute distance. The resulting small leakage equals the amount of air passing the supply orifice 80$^a$ thereby holding constant the pressure in the chamber 90$^a$ and the passage 81 leading to the remote receiver 76.

In a similar way, the control pressure thus established is increased progressively as the lever 78 is moved away from the centered position causing the spring 89 to be compressed so as to allow the control pressure to build up higher before the diaphragm starts to move to open the valve 85 and permit leakage. Herein the construction and arrangement of the parts is such that the pressure in the control line 81 is 10 p.s.i. when the lever 78 is centered (Figs. 1 and 7), increases to 20 p.s.i. as the lever moves in opposite directions through ranges $a$ or $b$ (Fig. 7) hereinafter referred to as the inching ranges, and increases from 20 to 33 p.s.i. in the further movement of the lever through ranges $c$ and $d$ hereinafter referred to as the "forward" and "reverse" pitch ranges.

The position receiver 76 which is housed within the governor casing comprises a stem 92 connecting the end of the floating lever 75 to a piston or diaphragm 93 which is urged against a stop 94 by a compression spring 95 scaled to yield progressively as the pressure in the control line 81 and the receiver chamber 96 increases above 20 p.s.i. Thus, within the forward and reverse ranges $c$ and $d$ of the control lever, the stem 92 moves in accordance with changes in the control pressure in the line 81 and closely follows changes in the position of the lever.

Movement of the position receiver in response to an increase in the control pressure is communicated to the valve 65 which, when shifted below center, admits oil from the line 69 supplied from the governor line 44 to the servo cylinder 63 until the resulting movement of the piston 61 restores the valve to centered position. The speed setting of the governor is thus increased to correspond to the changed position of the control lever 78. In a similar way, raising of the valve stem 66 in response to a reduction in the control pressure toward 20 p.s.i., allows fluid to drain from the servo 60 until the valve 65 has again been recentered, the governor speed setting being reduced accordingly.

Propeller pitch adjustment

Movement of the pitch control member 26 between maximum pitch positions 28 and 29 in the forward and reverse directions of propulsion of the ship and through the flat pitch position 30 is effected by a servo 98 which is located near the propeller blade actuating mechanism and may as shown be of the rotary type having a vane type piston 99 fast on a shaft 100 and swingable around the interior of a casing 101 in response to pressure variations in chambers 102 and 103 on opposite sides of the vane. Preferably, the motion of the servo shaft is transmitted to the pitch adjusting element 26 to provide for greater increments of pitch adjustment for a given angular displacement of the shaft when the propeller is at low pitch. This is accomplished by a properly contoured cam 104 fast on the shaft and bearing against a follower 105 on the end of the adjusting lever 26 which is held against the cam by a suitable spring 26ª. The cam may, of course, be shaped to produce any desired ratio of transmission of the servo motion to the propeller pitch control valve.

In the flat pitch position of the parts shown in Fig. 1, the roller 105 engages the intermediate part of the cam surface. As the cam turns clockwise, the rise of its surface swings the pitch control lever 26 into a range for producing forward propulsion of the ship. Similarly, as the cam turns counterclockwise from the flat pitch position, the follower 105 rides a fall on the cam surface thereby shifting the control lever into the reverse pitch range, that is, for propelling the ship backwardly. As before, the cam surface is shaped to provide a high motion transmission ratio in the initial part of the reverse pitch range.

It will be observed that the vane 99 constitutes a piston element of a double range servo, which adjusts the propeller pitch to one side or the other of zero for forward or reverse propulsion of the ship by the admission of pressure fluid, selectively to the chambers 102 and 103.

The pressure fluid may be derived from the source P above described and delivered through a conduit 106 (Fig. 1) preferably at about 80 p.s.i. as determined by a pressure reducer R.

Selection of pitch range

In accordance with one aspect of the invention, the pitch adjusting or load control servo 98 is conditioned for operation in the proper pitch range automatically as an incident to a manual selection made by swinging of the control lever 78 in the pilot house. This is accomplished in the present instance by an auxiliary servo 109 energizable selectively by remote control and operating on the shaft 100 through a stop coupling 110 to confine the operation of the servo 98 to the pitch range selected by the ship's pilot. Herein, the servo 109 comprises a piston element or vane 111 fast on a shaft 112 and swingable in an arcuate chamber 113 through a range equal to the length of the individual forward and reverse ranges f and r of the servo 98. The vane 111 is of substantially larger area, about twice in the present instance, than the vane 99 so that the servo 109 is capable of overriding the servo 98 when supplied with pressure fluid from the same supply 106. Fluid from the latter is admitted to either side of the piston through conduits 114 and 115 leading into opposite ends of the chamber 113.

The stop coupling 110 is operated by the servo 109 to change the operating range of the pitch servo 98. For this purpose, the shafts 100 and 112 are disposed end to end and stops 116 and 117 are fixed on the end of the shaft 112 for coaction with an arm 118 fast on the adjacent end of the shaft 100. The stops comprise arcuate lugs 119 rigid with and projecting from a block 119ª and lying in the plane of the arms and with their opposed sides forming the stops 116 and 117 and angularly spaced apart to correspond to the forward pitch range f of the servo 98. Similarly, the spacing of the other lug sides equals the length of the other or reverse pitch range. When pressure is applied to the conduit 114 the vane 111 will be held against one end wall of the chamber 113 thus positioning the stops 116, 117 as shown in Fig. 1 to condition the servo 98 for pitch adjustment in the forward direction only. Now, if the conduit 114 is drained and pressure is applied to the other end of the chamber 113 through the conduit 115, the vane 111 and the stops will be turned counterclockwise against the other end wall 120 of the chamber 113. With the stops thus held by a force greater than that capable of being exerted by the servo 98, the vane 99 of the latter can move back and forth only in the right end 103 of the servo cavity and thus adjust the pitch control lever within the reverse range r.

Transfer device and its control

The delivery of energy to the servos 98 and 109 to energize the latter in the proper direction selected by the control lever 78 is controlled in the present instance by a transfer device 122 preferably disposed adjacent the servo and having a member 125 movable back and forth between forward (Fig. 1) and reverse (Fig. 4) positions. Where, as here, fluid pressure servos are used, the transfer device takes the form of a valve having a ported casing 124 and a plunger 125 slidable therein and having lands coacting with the different ports in the casing. A compression spring 126 acts against one end of the plunger 125 to urge the latter into the forward position shown in full in Fig. 1. The plunger is shifted to the reverse position shown in Fig. 4 by a fluid servo 127 at the other end of the valve comprising a piston 128 having a rod that bears against the plunger and is slidable in a cylinder 129 whose length determines the stroke of the plunger.

Pressure fluid such as compressed air from the source 80 is applied to the head end of the cylinder 129 through a conduit 130 which extends to the pilot house of the ship and communicates with the outlet port 133 of a valve 131. The latter includes a plunger 132 movable from closed position (Fig. 1) to open position in which the port 133 is uncovered by a land 134. The valve stem is urged toward and constitutes the follower of cam surfaces 135 and 136 which herein are formed on the side of the cam 83 opposite the surfaces 90 and 91. The surface 135 permits the plunger 132 to be held in valve closed position while the lever 78 is disposed between idle position (Fig. 1) and full forward speed position, the servo 127 then remaining deenergized. When the lever is swung clockwise out of idle position (see Fig. 4), the surface 136 depresses the plunger 132 to open the valve and admit compressed air from the supply line 80 to the servo 127. The piston 128 is thus moved to shift the transfer valve plunger to the reverse position (Fig. 4) where it remains until the lever 78 is again returned to idle position or beyond. As a result, the valve plunger moves back to the position shown in Fig. 1 thus interrupting the connection to the air supply and releasing the air from the cylinder 129 so as to allow the spring 126 to return the transfer valve plunger 125 to the forward pitch position (Fig. 1).

In both the forward and reverse positions of the transfer valve (Figs. 1 and 4), the fluid pressure source 106 communicates with a space 138 between two of the plunger lands and therefore with a passage 139 leading to a port 140 in the valve casing. In the forward position of the plunger (Fig. 1), the port 140 is connected through a space 141 to the conduit 114 leading to the upper end of the stop actuating chamber 113. At the same time, the other passage 115 of this servo registers with an annulus 142 of the plunger 125 at the end of an axial passage 143 which communicates continuously with a drain space 144 at the end of the valve cylinder. The drain passage 143 also communicates with an annular space 137 intermediate the ends of the plunger.

In the other or reverse position (Fig. 4) of the transfer valve, the connections of the stop servo 109 are reversed, the passage 114 registering with the drain passage 143 while the port at the end of the passage 115 registers with the space 141 and thus with the pressure supply passage 139. As a result, pressure fluid is admitted to swing the vane 111 counterclockwise to its other limit position against the wall 120 as shown in Fig. 4.

The transfer valve also controls the directions of flow of pressure fluid to and from the different chambers 102 and 103 of the pitch adjusting servo 98 whose passage 106 terminates in a port in the valve casing and registers with a plunger space 145 which, in the forward position of the plunger (Fig. 1) communicates with a port at the end of the passage 146 and, in the reverse position (Fig. 4) registers with a port at the end of a passage 151. The other servo passage 107 has two branches terminating at ports 147 and 148 which are spaced along the valve casing, the former registering with a plunger space 149 in both positions of the valve while the latter registers with a space 150 in the forward position of the valve and with the space 145 in the reverse valve position. Thus by deenergization and energization of the servo 127, the transfer valve plunger 125 is disposed in a forward position (Fig. 1) in which the passages 146 and 151 are connected to the servo passages 108 and 107 or a reverse position (Fig. 4) in which the connections are reversed, the passages 146 and 151 then being connected to the servo passages 107 and 108 respectively.

*Automatic load control*

An important aim of the present invention is to adjust the pitch of the propeller automatically and therefore the loading of the engine so as to maintain for each selected engine speed a fixed horsepower output of the engine. This is accomplished by controlling the selective energization of the pitch adjusting servo 98 by a mechanism, indicated generally at 153, which may be built into the governor and which detects deviations of the horsepower output of the prime mover in opposite directions from a unique value for each different speed setting of the governor 31. Since the governor controls the engine speed, its speed setting is an indication of engine speed while the position of the fuel adjuster 14 represents the torque being delivered at any time. Accordingly, the horsepower output is determined by so combining the movements of the speed setter 32 and the fuel adjuster 14 differentially as to produce a resultant signal which is of one value when the predetermined horsepower for one speed setting is being delivered and which varies in opposite directions from such value as the horsepower for the same speed setting delivery increases and decreases.

Where, as here, the pitch servo is of the hydraulic type, the power output sensing device may take the form of a valve 154 having a stem 155 with lands 156 and 157 thereon slidable in a cylinder of the valve casing 158 straddling a port at the end of a conduit 159 communicating with the fluid pressure supply passage 139. The lands cooperate with similarly spaced ports 160 and 161 leading to passages 162 and 163 which extend to a shuttle valve 164 to be described later by which the passages may be connected as shown in Fig. 2 to the passages 146 and 151 leading to the transfer valve.

The valve ports 160 and 161 are so spaced as to be covered when the valve stem 155 is in a neutral or centered position which represents the desired horsepower output to be derived for each different engine speed. When the stem is disposed above this position as shown in Fig. 1, the port 160 is uncovered by the land 156 and pressure fluid from the line 159 is admitted to the passage 162 and through the transfer valve to the chamber 102 of the servo 98. At the same time, the land 157 is disposed above the port 161 so as to allow fluid to drain from the other servo chamber 103 out through the casing of the valve 154. As a result, the servo 98 is energized to decrease the propeller pitch.

Conversely, when the valve member 155 is shifted below the centered position, the port 161 is uncovered admitting pressure fluid to the passage 163 and the servo chamber 103 thus turning the shaft 100 clockwise to increase the pitch when the ship is being propelled forwardly. At the same time, the other servo chamber 102 is drained through the port 160 of the valve 154.

The differential mechanism for combining the speed setting of the governor and the fuel supply to the prime mover and applying the resultant signal to the control device 154 may, as in the present instance, be of a mechanical character and take the form of a simple floating lever 166 pivotally connected at 168 intermediate its ends to the stem 155 of the valve 154. To position one terminal of the differential in accordance with changes in the governor speed setting, one end of the lever is herein pivotally connected at 167 directly to the piston rod 32 of the speed adjusting servo 60. In a similar way, the other end of the lever is pivotally joined at 169 to the piston rod 14 of the fuel adjusting servo 15. The connections are such that for any given fuel setting an increase in the governor speed setting will lower the valve plunger 155 and for a given governor speed setting an increase in the fuel supply will raise the valve plunger.

To minimize the adjusting movements of the propeller blades during their automatic control by the output sensing mechanism, it is desirable to reduce the sensitivity of response of the pilot valve 154 and produce a narrow dead band, for example, 2½ percent, in the automatic load control. This may be accomplished by making the valve ports 160 and 161 slightly narrower, for example, .006 of an inch, than the lands 156 and 157 with which they cooperate. The valve plunger 155 may thus move through a very small range without changing the energization of the pitch servo 98.

With the engine output sensing mechanism above described, it will be apparent that for each different engine speed as determined by the governor speed setting, the valve member 155 will be centered when the fuel rod 14 is in a predetermined position, the engine therefore delivering a predetermined torque and consequently a predetermined power output at the prevailing speed being maintained by the governor and under the load imposed by the propeller at its prevailing pitch. This unique horsepower value is so selected by adjustment of the linkage connection or the ratio of the floating lever 166 as to provide optimum efficiency in the operation of the engine and propeller.

To summarize the operation under the automatic load control, assume now that equilibrium has been established during forward propulsion of the ship, the parts thus being positioned as shown in Fig. 2. The established forward pitch will remain constant so long as the ship load does not change. Now, if the load is increased so as to slow down the engine, the governor will operate to increase the fuel supply. As a result, the lever 166 is swung in a direction to raise the pilot valve stem 155 out of centered position as shown in Fig. 1. Pressure fluid from the supply line 106 is thus admitted to the passages 162 and 146 and through the transfer valve space 145 and the passage 108 leading to the chamber 102 of the servo 98. At this time, the chamber 103 is drained through the passage 107, the valve space 150 and the passages 151 and 163, the port 161 then communicating with the drain outlet of the valve 154.

The vane 99 and the shaft 100 are thus turned counter-clockwise and the resulting fall of the cam 104 swings the pitch control lever 26 counterclockwise to produce a corresponding decrease in the propeller pitch. Such a decrease in the load imposed by the propeller causes an increase in the engine speed which, through the action of the governor, reduces the fuel supply and this in turn moves the pilot valve plunger 155 back toward the centered position. This action continues until the valve is again centered and the unique power output of the engine reestablished.

In a similar way, a decrease in the ship load causes the valve plunger 155 to be lowered below the centered position to initiate delivery of pressure fluid through the passages 163, 151 and 107 to the servo chamber 103, the chamber 102 being connected to the drain outlet of the valve 154. This causes clockwise turning of the shaft 100 and the lever 26 which produces an increase in the propeller pitch and loading of the engine until the valve has been restored to neutral position by the interaction of the governor and the pitch adjusting servo. It will be seen that the load control operates automatically and continuously to adjust the propeller pitch to give a definite value of horsepower for each engine speed selected by the pilot by adjusting the control lever. Thus, as shown in Fig. 5, the fuel supply and horsepower output of the prime mover change with the engine speed in a fixed relation. Above the idling speed, which may be 300 r.p.m., the fuel increases along a straight line 172 until full fuel is reached at 720 r.p.m. This produces the parabolic horsepower curve 173 each point on which is established by the automatic pitch control acting in the manner above described following a change in the engine speed. Of course, the shape of the horsepower curve may be varied as desired by interposing a cam or other ratio varying device in the linkage between the piston 32 or the rod 14 or both and the lever 166.

Restoration of flat pitch

The invention also contemplates the provision of means operating automatically as an incident to shutting down of the engine to energize the servo 98 in a manner such as to move the propeller blades to the flat pitch position so that the propeller offers minimum resistance to restarting of the engine. This may be accomplished through the inching control later to be described or, when such control is omitted, the return to flat pitch may be effected by the supplemental linkage connection shown in Fig. 9 between the fuel adjusting member 14 and the plunger 155 of the pilot valve 154. This connection includes a generally straight lever 175 pivoted on a fixed fulcrum 176 on the governor casing with one end of the lever underlying a pin 177 projecting from the side of the fuel adjusting rod 14. In a similar way, the other end of the lever underlies a pin 178 projecting from the stem 155 of the pilot valve. The pins are so located as to become effective only when the fuel rod is moved in the fuel decreasing direction beyond the idling position and to the "off" position as a result of stopping the engine through the usual shut down devices, such upward movement of the stem 155 independently of the load control lever 166 being permitted by an elongated slot 175ᵃ in the valve stem. As the fuel control member 14 reaches the fuel off position as shown in Fig. 3, the lever 175 is rocked to raise the plunger 155 slightly above the centered position where it remains during engine shut down. Now, when the pump for supplying fluid pressure for the propeller adjusting mechanism is again started preparatory to starting the engine, this pressure fluid will flow through the lines 106, 159, through the off center valve 154 and the passage 162 to the servo chamber 102 or 103 then connected thereto. The vane 99 is thus moved in the pitch decreasing direction until the stop 116 or 117 controlled by the servo 109 is encountered, the propeller then being at flat pitch.

Inching control of propeller pitch

In another aspect, the invention contemplates adjustment of the propeller pitch under manual control and in fine increments so that, with the engine operating at idling speed, propelling force may be derived and adjusted with great accuracy for holding the position of the ship against a small resistance such as that caused by wind, the current of a stream, or the like. This is achieved by a supplemental control called the "inching" control of the pitch servo 98 and involving mechanism mounted in close association with the pitch servo and the transfer valve 122 but controlled from the pilot house of the ship.

Preferably, the inching control is achieved by manipulating the hand lever 78 through the forward and reverse pitch ranges a and b while the governor speed setting remains unchanged with the engine running idly. Such disabling of the governor speed adjuster during inching adjustment of the propeller is achieved in the present instance by rendering the governor speed adjusting system insensitive to changes in the control pressure by which the inching adjustment is effected. More particularly, the spring 95 of the position receiver 76 is made so stiff that it is not overcome until the pressure in the line 81 exceeds 20 p.s.i. Accordingly, the inching control is effected by pressure changes from 10 to 20 p.s.i. which are produced as the lever 78 is moved away from the zero pitch position in either direction and through the range a or b. These progressive changes in the control pressure are produced by the initial parts of the rises 90 and 91 on the cam 83.

An auxiliary position receiver 180 (Fig. 1) similar to the receiver 76 communicates with the end of a branch 181 of the control pressure line 81. A stem 182 connected to the diaphragm 183 of this receiver is moved against a spring 184 and thus positioned accurately in accordance with pressure changes in the line 81 as controlled by the transmitter 79 and the hand lever 78.

As in the case of the load control mechanism, energization of the pitch servo 98 is controlled by a valve device 185 having a stem 186 with lands 187 and 188 thereon cooperating with ports 189 and 190 in the valve casing which communicates with the pressure fluid supply line 139. The ports lead through passages 191 and 192 to the shuttle valve 164 and to and from the latter through the passages 146 and 151 to the pitch servo.

The stem of the pilot valve is pivotally connected at 193 to a lever 194 bearing near its other end against the stem 182 of the pressure receiver 180 and urged downwardly by spaced compression springs 195. To make the movements of the pitch control member 26 follow proportionately the position changes of the receiver stem 182, the movements of the member are transmitted back to the lever 194, the restoring connection herein taking the form of a rod 196 bearing at one end 199 against the same side of the lever as the stem 182 and at a point located between the valve 185 and the stem and in alinement with one of the springs 195. A roller 197 on the other end of the rod rides a heart shaped cam 198 on the servo shaft 100 so as to be raised progressively as the propeller pitch is increased in either direction from zero. The shape of the cam surfaces and therefore the ratio of transmission of the restoring motion determines the increment of propeller pitch change for a given change in the position of the receiver stem 182 and therefore in the position of the control lever 78.

With the parts thus arranged, an increase in the control pressure will raise the stem 182 and swing the lever 194 about the rod end 199 as a fulcrum thus lowering the stem of the pilot valve out of the centered position shown in Fig. 1. Pressure fluid is thus admitted to the passages 192 and 151 and the servo chamber 103 while the passages 191 and 146 are connected to the drain thereby initiating an increase in the propeller pitch which continues until the rod 196 has been moved far enough to restore the centered position of the valve 185. Conversely, a decrease in the control pressure lowers the stem 182 causing the valve plunger 186 to be raised to admit pressure fluid through the passes 191 and 146 to the other servo chamber 102, the chamber 103 being at the same time drained. As a result, the propeller pitch is decreased until the valve is recentered by the follow-up motion.

Similar pitch adjusting action but in the different ranges takes place in response to movement of the hand lever 78 to either side of the zero or flat pitch position. This is for the reason that, as described above, the transfer valve 122 remains in the forward position (Fig. 1) when the hand lever is disposed in the forward range a and is shifted by the servo 127 to the reverse position (Fig. 4) when the hand lever is turned clockwise to condition the propeller for backward movement of the ship. During the inching adjustment of the propeller by movement of the hand lever 7 within either of the ranges a and b, the governor 31 remains set at the idle speed which is thus maintained for all different pitch settings selected by the inching control. Usually, the inching adjustment does not exceed more than half of the full pitch range which, because of the low engine speed, represents a small part of the available horse power.

*Automatic transfer between load and inching control*

Transfer of the control of the servo 98 from one of the pilot valves 154 and 185 to the other is effected by the shuttle valve 164 which is interposed in the fluid passages leading from these valves. The shuttle valve comprises a casing having a plunger 201 slidable therein and urged by a compression spring 202 into the inching control position shown in Fig. 1. In this position, the passages 191 and 192 leading from the pilot valve 185 are connected respectively to the passages 146 and 151 above described that lead through the transfer valve to the pitch servo.

The shuttle valve is shifted automatically in response to pressure changes in the control line 81. When this pressure exceeds 20 p.s.i., the lever 194 is raised against a stop 203 as shown in Fig. 2 and in this movement, a rod 204 is permitted to move upwardly under the action of a spring 205. The rod carries the member 206 of a valve 207 which controls the release of pressure fluid from a passage 208 which communicates at one end with the head 209 of the shuttle valve plunger. At the other end and beyond the valve 207, the passage 208 is connected through a restriction 210 with the oil supply lines 139 and 159. With the lever raised against the stop (Fig. 2), the spring closes the valve 207 and thus prevents the bleeding of pressure fluid out of a passage 208.

Pressure builds up in the passage 208 to a value sufficient to act on the plunger end 209 and shift the latter against the action of the spring 202 until the end 209 uncovers a port 211 far enough to permit a pressure reduction in the passage 208 just sufficient to balance the force of the spring 202 at the rate of admission of fluid through the restriction 210. The control mechanism will be conditioned for normal operation of the ship under the automatic control of the governor and the load control valve 154. Then, the passages 191 and 192 are closed by the lands of the plunger 201 and the passages 162 and 163 leading from the pilot valve 154 are connected to the passages 146 and 151 leading through the transfer valve 122. The pitch servo 98 is then under the exclusive control of the load control pilot valve 154.

When, after operation of the pitch adjusting mechanism under the automatic control, the control lever 78 is moved back into one of the inching ranges *a* and *b*, control pressure will be reduced below 20 p.s.i. whereupon the receiver 180 permits the springs 195 to move the rod 204 and open the bleed valve 207. The pressure drop in the passage 208 permits the spring 202 to shift the plunger 201 to the position shown in Fig. 1. Control of the pitch servo is thus returned to the inching system and any forward or reverse propeller pitch within the inching ranges may be obtained by correspondingly positioning the lever 78.

The inching control also operates automatically to restore the propeller to zero pitch in response to the return of the hand lever 78 to the idle position (Fig. 1). As a result, the transfer valve 122, if not already in the forward position, is shifted to this position under the control of the valve 131 which is then positioned by the cam surface. At the same time, the receiver stem 182 and the lever 194 are moved against the stop 203. With the propeller blades at some pitch, either forward or reverse, above zero, the plunger 186 of the valve will be raised above centered position by the restoring rod 196 then engaging a rise of the cam 198. As a result, pressure fluid will be admitted through the passage 114 to the stop servo 109 and through the valve 185 and the passages 191 and 146 to the chamber 102 of the pitch servo 98. Therefore, if the propeller is in forward pitch, the shaft 100 will be turned counterclockwise by the servo 98 until zero pitch has been obtained as determined by the depression in the restoring cam 198. On the other hand, if the propeller is in reverse pitch, the shaft will be turned clockwise by the servo 109 to the zero position shown in Fig. 1.

*Manual control of propeller pitch*

Under emergency conditions which may arise in service use, it is sometimes desirable to operate the pitch control member 26 directly and independently of the power servo 98 as by manipulating pull cables 213 extending around a pulley 214 fast on the shaft 100. To permit such normal actuation and free turning of the shaft, provision is made for disabling the servo 98 as by releasing the pressure in both of its chambers 102 and 103. This is accomplished by shifting the transfer valve 122 to a third position as shown in Fig. 8. For this purpose, a knob 215 on the extended end of the plunger 125 is pulled outwardly until a notch 217 in the plunger is presented to a detent 216 and the latter enters the notch so as to hold the plunger against the action of the spring 126. In this position of the plunger, the pressure supply passage 106 is separated from the passage 139 by a land 218, the passages 114 and 115 of the stop servo 109 are connected together by the drained plunger space 137, and the passages 107 and 108 leading to the pitch servo 98 are similarly connected by the plunger space 149. The oil in the servos 98 and 109 may thus flow back and forth freely and, as a consequence, neither servo offers resistance to turning of the shaft 100 by the forces applied manually to the pull cables 213. The control member 26 may then be adjusted easily to directly control the valve 23 and the main blade adjusting servo.

*Quick reversal control*

In the operation of some ships, it is sometimes desirable when the ship is traveling full speed ahead to stop the ship quickly and apply full power in the reverse direction a maneuver which would be effected with the control system above described by swinging the control lever 78 from the maximum forward speed position to the full reverse speed position. The invention contemplates modifying the control above described in a novel manner to minimize the power delivered to the propeller by the prime mover during the substantial interval required for the inherently slow acting propeller pitch actuator 21, 22 to reach the zero pitch position following rapid swinging of the lever 78 from high speed ahead to high speed reverse which results in only a slight and momentary dip in the engine speed. The modifying action is achieved through means interconnecting the engine speed setting mechanism and the propeller pitch adjuster and acting in response to such rapid swinging of the control lever to force a slowing down of the engine preferably to idle speed and the holding of this speed until the servo 21, 22 has reduced the pitch of the propeller blades substantially to zero.

While interlocking means may operate mechanically, electrically, or by fluid pressure or a combination thereof, the means shown herein for purposes of illustration may (See Fig. 10) be of simple mechanical character when the cam 83 above referred to is located adjacent the pitch adjusting mechanism. This will be the case where, as is desirable in some installations, the cam is separated from the control lever 78 and adjusted by remote control as by cables 220 (Fig. 11) extending through suitable guides between the ship's pilot house and the engine room and wound around pulleys 222 and 221 respectively fast on the camshaft 83ª and a shaft 223 carrying the hand lever 78. As before, the cam follows the movements of the hand lever and adjusts the governor speed setting, selects the direction of pitch adjustment and transfers from inching to automatic control and vice versa.

In the form shown, the interlocking means comprises an arm 225 fast on the camshaft 83ª and coacting with stops 226 and 227 which are moved into and out of the path of the arm in response to movement of the propeller blades 18. The stops are disposed on opposite sides of the arm when in zero pitch position and are formed on one of the ends of levers 228 and 229 fulcrumed intermediate their ends on a fixed pivot 230. The other weighted ends of the levers constitute the followers of cams 231 and 232 carried by a rod 233 slidable in suitable guides (not shown) and linked to the lever 25 or other part which moves back and forth with changes in the pitch of the propeller blades 18.

The arrangement is such that when the blades are at zero pitch, the rod 233 is positioned as shown in Fig. 10 and both stops 226 and 227 are cammed out of interfering relation with respect to the arm 225. As the blade pitch is increased for example, in the forward direction (Fig. 11), the cam 231 allows the lever 229 to turn clockwise and raises the stop 227 into the path traversed by the arm 225 when moved away from idle speed position in the reverse pitch direction.

If, with the parts thus positioned, an emergency arises making a reversal of the ship's travel desirable, the lever 78 is moved quickly to the center position, which changes the governor speed setting to quickly reduce the engine speed. At the same time, the servo 98 acts to initiate operation of the blade actuator to reduce the pitch. The latter action is much slower than the engine slow down so that the engine attains idle speed while the blades are still at a substantial forward pitch. As a result, the stop 227 remains in raised position (Fig. 11) and blocks the path of the arm 225 so as to prevent movement of the latter any substantial distance into the reverse ranges b and d. This condition obtains until, by movement of the blades to zero pitch, the rod 233 has been returned to the position shown in Fig. 10 whereupon the cam 231 lowers the stop 227 and frees the hand lever 78. Then, the lever may be moved in the pitch reversing direction to increase the speed of the engine as rapidly as possible and, with the propeller pitch reversed, to bring the ship to a stop in the shortest possible time. By thus preventing an increase in the engine speed until after the propeller blades are at or near zero pitch, the energy which the engine delivers to the ship through the propellers after the emergency condition arises and the hand lever 78 is moved to reduce the engine speed is reduced to a minimum. As a consequence, the time required for stopping the ship is reduced correspondingly.

*Operation of combined control*

To summarize the operation of the combined automatic load control and manual inching control under various service conditions, reference will be made to Fig. 6 which shows the relative values of engine speed, fuel supply and horsepower output obtained in different positions of the control lever 78. Assuming that compressed air is available at the source 80, that oil at the proper pressure is in the supply line 106, and that the engine is operating at idling speed 300 r.p.m. with the control lever 78 in the centered position, the parts will be positioned as shown in Fig. 1, the propeller blades being at zero pitch, the transfer valve 122 in the forward position, and the shuttle valve 164 in the inching position.

Now, as the lever 78 is moved into the forward inching range a, the control pressure is increased above 10 p.s.i. and the beam 194 is rocked to lower the control valve 186 and energize the servo 98. The propeller pitch is thus increased until the valve is recentered at a pitch corresponding to the control lever position. The same pitch adjustment is effected when the control lever is moved into the reverse inching range. In that case, however, the initial movement of the lever 78 away from zero actuates the valve 131 to energize the servo 127, and shift the transfer valve 122 thus reversing the energization of the stop servo 109 and conditioning the pitch servo 98 for operation in the reverse range r only. By manipulating the control lever within the inching ranges a and b, a fine adjustment of the propeller pitch may be achieved to produce a propelling force sufficient to hold the ship in a desired position as to facilitate very slow maneuvering of the ship. The restoring mechanisms 25 and 196 are constructed to limit the range of such inching adjustments to a maximum pitch of about 50 percent of full pitch. During these adjustments the engine continues to operate at idle speed and the fuel is increased slightly as indicated at 235 in order to maintain the idling speed. This also results in a small increase in the horsepower output of the engine at 236.

For normal high speed propulsion of the ship, either forward or backward, the control lever 78 is moved in one of the ranges c and d.

Assuming that the ship is to be moved forwardly at normal speed, the transfer valve 122 will be shifted to the forward position (Fig. 1) as the lever 78 passes beyond the range a and the control pressure will use above 20 p.s.i. as the lever enters the range c. The resulting upward movement of the beam 194 allows the bleed valve 207 to close and the pressure in the passage 208 to build up enough to shift the shuttle valve 164 to disable the valve 185 and place the load responsive valve 154 in control of the pitch servo 98. The rise in the control pressure to a value above 20 p.s.i. and correponding to the engine speed desired increases the speed setting of the governor whereupon the governor initiates an increase in the fuel supply to the engine. These changes in the position of the speed setter 32 and the fuel rod 14 oppose each other in the positioning of the load control valve 154 which after equilibrium will be centered as shown in Fig. 2. The values of engine speed, fuel supply, and horsepower output of the engine thus bear a fixed relation and fall on curves 237, 238 and 239.

If, for any reason, the load imposed on the ship is reduced below the unique value for the existing speed setting, the pilot valve 154 will, as a result of the governor action in compensating for the increased engine speed, be dropped below center by movement of the fuel rod and pass oil to turn the load control servo 98 in a clockwise direction. The resulting movement of the output cam causes the propeller pitch to be increased thereby increasing the load and causing the governor to increase the engine fuel supply. This action continues until the fuel is increased an amount sufficient to recenter the pilot valve and interrupt the motion of the load control servo. The opposite action takes place when the load on the ship is increased.

If the pilot moves the control lever 78 into the reverse range, the transfer valve 122 is shifted to the right as shown in Fig. 4. This reverses the stop servo 129 causing it to rotate to its extreme clockwise position and drag the load control servo 98 to its flat pitch position. At the same time, the lines connecting the pilot valve 154 and the load control servo are reversed. Thus the operation of the load control servo is limited in one direction and turns the output cam counterclockwise to increase pitch.

If the plunger of the transfer valve 122 is manually pulled out to the position shown in Fig. 8, where it may be latched, the oil supply is turned off and both sides of both servos 98 and 129 are connected to the drain. This permits manual adjustment of the propeller pitch through the cables 213.

I claim as my invention:

1. A combined prime mover and propeller pitch control having, in combination, a first servo having a driven member for adjusting the fuel of said prime mover, a second servo having a driven member movable in opposite directions away from a predetermined flat pitch position to increase the pitch of the propeller in forward and reverse pitch ranges respectively, a governor driven by said prime mover and controlling the energization of said first servo to maintain a prime mover speed corresponding to the governor speed setting, said governor having a movable speed adjusting member, a control device movable back and forth through a centered position, connections combining the motions of said fuel adjusting and speed adjusting members to position said device in accordance with the prevailing power output of said prime mover, mechanism controlled by said device and controlling said second servo to maintain the propeller pitch fixed when said device is centered, to increase the pitch when the device is moved off center by an increase in the governor speed setting or by a fuel decrease, and to decrease the pitch when said device is off center in the opposite direction, a manually operable control element movable in opposite directions away from a low speed position, means controlled selectively by said element and operable to increase the speed setting of said governor progressively as the element is moved in either direction away from said low speed position, a transfer mechanism having an element movable between forward and reverse pitch positions for conditioning said pitch servo for operation under the control of said device in said forward and reverse pitch ranges, a servo for actuating said transfer element, and means controlled by the movement of said control element to cause said transfer servo to position said transfer element into said forward and reverse pitch positions respectively when the element is disposed on opposite sides of said low speed position.

2. A combined prime mover and propeller pitch control having, in combination, an adjustable governor having a servo for varying the fuel supply to said prime mover to maintain selected speeds thereof, a second servo having a driven member movable to adjust the pitch of the propeller in forward and reverse pitch ranges, a control device movable back and forth through a centered position, means jointly responsive to changes in the governor speed setting and the fuel supply to said prime mover to position said device in accordance with the prevailing power output of said prime mover, mechanism controlled by said device and controlling said second servo to maintain the propeller pitch fixed when said device is centered, to increase the pitch when the device is moved off center by an increase in the governor speed setting or by a fuel decrease, and to decrease the pitch when said device is off center in the opposite direction, means including a manually operable control element operable to increase the speed setting of said governor progressively as the element is moved in either direction away from a low speed position, and transfer mechanism controlled by the movement of said control element to condition said second servo for operation in said forward and reverse pitch ranges respectively when the control element is disposed on opposite sides of said low speed position.

3. A combined prime mover and propeller pitch control having, in combination, a first servo for adjusting the fuel of said prime mover, a second servo having a driven member movable in opposite directions away from a predetermined flat pitch position to increase the pitch of the propeller in forward and reverse pitch ranges respectively, a governor automatically controlling said first servo to maintain a prime mover speed corresponding to the governor speed setting, means jointly responsive to changes in the governor speed setting and the fuel supply to said prime mover to produce a signal whose value corresponds to the prevailing power output of said prime mover, a device for sensing deviations of said signal and controlling said second servo to maintain the propeller pitch fixed when said signal is of a predetermined value, and to increase and decrease the pitch when the signal deviates in opposite directions from such value, means including a manually operable control element operable to increase the speed setting of said governor progressively as the element is moved in either direction away from a predetermined low speed position, a transfer mechanism having an element movable between forward and reverse pitch positions for conditioning said pitch servo for operation under the control of said device in said forward and reverse pitch ranges, and means controlled by the movement of said control element to shift said transfer element into said forward and reverse pitch positions respectively when the element is disposed on opposite sides of said low speed position.

4. The combination of, a propeller adjustable through forward and reverse pitch ranges on either side of a flat pitch, a prime mover driving said propeller, an automatically adjustable governor for regulating the energy supply to the prime mover to maintain selected speeds thereof, a fluid pressure servo having a piston element and operable to adjust the pitch of said propeller and hold the same at any selected pitch within either one of said ranges, a manually operable control element movable back and forth on either side of a predetermined flat pitch position, mechanism operable in response to movement of said element in either direction away from said position to condition said servo for adjustment of the propeller in the corresponding one of said ranges, a control valve governing the admission of pressure fluid to said servo to vary the propeller pitch in the prevailing one of said pitch ranges, means for increasing the speed setting of said governor in response to movements of said control element in opposite directions away from said position, and mechanism jointly responsive to changes in the speed setting of said governor and the amount of energy supplied to said prime mover to adjust said control valve.

5. A combined prime mover and propeller pitch control having, in combination, a first servo having a driven element for adjusting the fuel of said prime mover, the position of said element at any time corresponding to the fuel delivery to the prime mover, a second servo energizable selectively to increase and decrease the pitch of a propeller driven by said prime mover, a governor driven by said prime mover and controlling the energization of said first servo to maintain a prime mover speed corresponding to the governor speed setting, said governor having a movable speed adjusting member whose position determines said speed setting, a control device movable back and forth through a centered position, motion transmitting connections between said fuel element, said adjusting member and said device and operable to combine the motions of said fuel element and speed adjusting member to position said device in accordance with the resultant of said motions, and mechanism controlled by said device and controlling said second servo to maintain the propeller pitch fixed when said device is centered, to increase the pitch when the device is moved off center by an increase in the governor speed setting or by a fuel decrease, and to decrease the pitch when said device is off center in the opposite direction.

6. The combination of, an adjustable pitch propeller, a prime mover driving the same and having a fuel adjusting element movable away from and toward a fuel off position, a servo for adjusting the pitch of said propeller, a governor automatically positioning said element to maintain a prime mover speed corresponding to the governor speed setting, a control device movable back and forth to control the energization of said servo selectively, means for adjusting said device in accordance with changes in the position of said fuel element and the speed setting of said governor, a hand lever operatively connected to said governor for adjusting the speed setting of said governor, and mechanism interconnecting said device and said fuel element and operable automatically as an incident to movement of said fuel element to said off position to adjust said device and cause said servo to move to flat pitch position.

7. The combination of, a prime mover, a first servo having a driven element for adjusting the fuel of said prime mover, a controllable pitch propeller, a second servo for adjusting the pitch of said propeller, a governor driven by said prime mover and controlling the energization of said first servo to maintain a prime mover speed corresponding to the governor speed setting, mechanism jointly responsive to changes in said governor speed setting and the fuel supply to said prime mover and operable to regulate the energization of said second servo, a device manually movable through forward and reverse pitch ranges through an intermediate zero pitch position to control the direction of pitch adjustment produced by said mechanism, means responsive to the movements of said device and operable to increase the speed setting of said governor as the device is moved in either direction away from said zero position, and mechanism responsive to changes in the pitch of said propeller and operable, following movement of said device through one of said ranges to decrease the engine speed, to prevent the engine speed from being increased by movement of the device into the other of said ranges until the propeller pitch has been reduced substantially to zero.

8. The combination of, a prime mover, a first servo for moving a speed setting element for said prime mover, a controllable pitch propeller, a second servo for adjusting the pitch of said propeller, a device manually movable through forward and reverse pitch ranges through an intermediate zero pitch position, mechanism responsive to the movement of said device away from said position into said forward range to increase the speed of said prime mover and also control said pitch servo to increase the propeller pitch, said mechanism acting to increase the prime mover speed and increase the propeller pitch in the reverse direction upon movement of the device away from said zero position into said reverse range, and mechanism interlocking the movements of said speed setting element and the propeller blades and operable in response to a decrease in the speed setting by movement of said device toward zero position to prevent the speed setting from being increased by movement of the device in the same direction beyond said position until the propeller pitch has been returned substantially to zero.

9. The combination of, a prime mover, a controllable pitch propeller driven by said prime mover, a servo for adjusting the pitch of said propeller, a device manually movable through forward and reverse pitch ranges through an intermediate zero pitch position, mechanism responsive to the movement of said device away from said position into said forward range to increase the speed of said prime mover and also control said pitch servo to increase the propeller pitch, said mechanism acting to increase the prime mover speed and increase the propeller pitch in the reverse direction upon movement of the device away from said zero position into said reverse range and operable in response to quick movement of said control device out of one full speed position toward the other full speed position and into said zero position to force a slowing down of the prime mover substantially to an idle speed, and means responsive to the movements of the propeller blades and operable to prevent a subsequent increase in the prime mover speed by movement of said control device beyond said zero position until the propeller pitch has been reduced substantially to zero.

10. The combination of, a prime mover having a fuel control element movable back and forth through different positions to correspondingly vary the fuel flow to the prime mover, a variable pitch propeller driven by said prime mover, a first servo having a driven element coupled to said fuel element for actuating the same, a second servo coupled to said propeller and energizable selectively to increase and decrease the pitch thereof, a governor responsive to the speed of said prime mover and controlling the energization of said first servo to adjust the position of said fuel element and maintain a prime mover speed corresponding to the governor speed setting, a member movable back and forth and having a position corresponding to the speed setting of said governor, a control device movable back and forth through a centered position, motion transmitting connections between said fuel element, said member, and said device and operable to combine the motions of the element and member and position said device in accordance with the resultant of said motions, and mechanism controlled by said device and controlling the direction and extent of energization of said second servo to maintain the propeller pitch fixed when said device is centered, to increase the pitch when the device is moved off center in response to an increase in the engine speed or to a fuel decrease, and to decrease the pitch when said device is off center in the opposite direction.

11. Apparatus as defined by claim 10 in which said mechanism constitutes the sole connection between the driven element of said pitch adjusting servo and said control device and the latter is positioned solely by the motions of said fuel element and said member whereby restoring of the device to centered position is effected by the reaction of said prime mover and governor to changes in the pitch of said propeller.

12. Apparatus as defined by claim 10 in which said connections include a differential having terminals respectively coupled to said fuel element and said member and an intermediate output element coupled to said control device.

13. Apparatus as defined in claim 10 in which said governor includes a speed setter movable back and forth to adjust the speed maintained by the governor and said member is said speed setter.

14. Apparatus as defined in claim 13 in which said differential is a floating lever connected at opposite ends to said fuel element and said speed setter respectively and intermediate its ends to said control device.

15. The combination of, a prime mover having a fuel control element movable back and forth through different positions to correspondingly vary the fuel flow to the prime mover, a variable pitch propeller driven by said prime mover thereby, a first servo having a driven element coupled to said fuel element for actuating the same, a second servo having a driven part coupled to said propeller and movable back and forth through forward and reverse pitch ranges disposed on opposite sides of a predetermined flat pitch position, said second servo being energizable selectively to increase and decrease the pitch of said propeller within the selected one of said ranges, a governor selectively adjustable for operation at different speeds responsive to the speed of said prime mover and controlling the energization of said first servo to adjust the position of said fuel element and maintain a prime mover speed corresponding to the governor speed setting, a member movable back and forth and having a position corresponding to the speed setting of said governor, a control device movable back and forth through a centered position, connections between said fuel element, said member, and said device and operable to combine the motions of the element and member and position said device in accordance with the resultant of said motions, mechanism controlled by said device and controlling the direction and extent of energization of said second servo to maintain the propeller pitch fixed when said device is centered, to increase the pitch when the device is moved off center in response to an increase in the engine speed or to a fuel decrease, and to decrease the pitch when said device is off center in the opposite direction, means including a manually operable control element operable to increase the speed setting of said governor progressively as the element is moved in either direction away from a low speed position, and transfer mechanism controlled by the movement of said control element to condition said second servo for operation in said forward and reverse pitch ranges respectively when the control element is disposed on opposite sides of said low speed position.

16. The combination of, a propeller adjustable between full and flat pitch, a prime mover driving said propeller, a fuel element movable back and forth to vary the fuel flow to the prime mover, an adjustable speed governor regulating the position of said fuel element and thus the energy delivered to said prime mover, a servo selectively operable to adjust the pitch of said propeller, a manually operable member, mechanism operable in response to movement of said member away from a predetermined flat pitch position and within one pitch range to control the energization of said servo and increase the pitch of the propeller in accordance with the extent of movement of the member away from such position, means responsive to the pitch adjusting movement of the propeller and coacting with said mechanism to proportion the adjustment of the propeller in accurate accordance with the movements of said member, mechanism responsive to movement of said member to maintain a low speed setting of said governor while the member is disposed within said range and to increase the governor speed setting in proportion to the extent of movement of the member outwardly beyond such range, a control device movable back and forth and regulating the energization of said pitch servo to adjust the position of said propeller, a second movable member responsive to the speed setting of said governor and occupying a position corresponding to the speed setting, motion transmitting connections between said fuel element, said control device and said second member and operable to position the device in accordance with the resultant of the motions of the element and the second member, and mechanism responsive to the movement of said manually operable member to a position outside of range to place said pitch servo under the control of said device.

References Cited in the file of this patent

UNITED STATES PATENTS

| | | |
|---|---|---|
| 617,633 | Brinkman | Jan. 10, 1899 |
| 2,306,953 | Jung | Dec. 29, 1942 |
| 2,477,868 | Forman | Aug. 2, 1949 |
| 2,536,158 | Chamberlin et al. | Jan. 2, 1951 |
| 2,600,612 | Bollo | June 17, 1952 |
| 2,645,293 | Ogle et al. | July 14, 1953 |
| 2,667,935 | Woodward | Feb. 2, 1954 |
| 2,703,148 | Pearl | Mar. 1, 1955 |

FOREIGN PATENTS

| | | |
|---|---|---|
| 903,082 | France | Sept. 24, 1945 |
| 913,010 | France | Aug. 27, 1946 |